Jan. 29, 1929.
J. J. THACHER
1,700,340
WORK RELEASING DEVICE FOR LATHES
Filed July 5, 1924
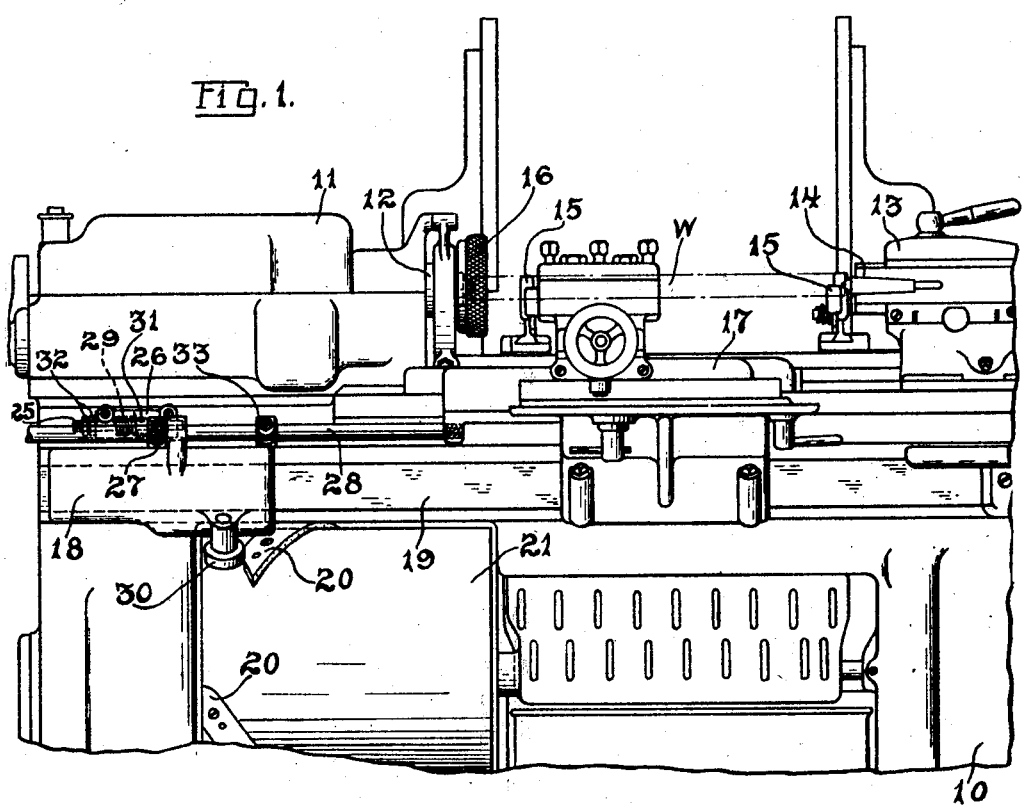
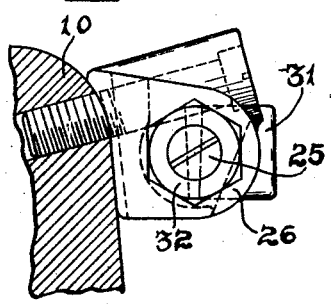
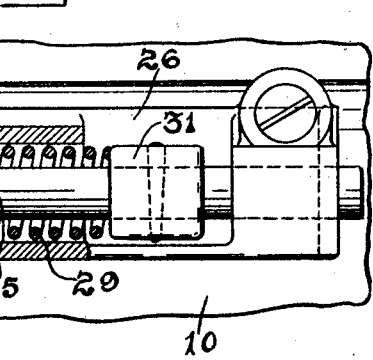
INVENTOR
J. J. Thacher
BY
Joseph J. Schofield
ATTORNEY Patented Jan. 29, 1929.

1,700,340

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

WORK-RELEASING DEVICE FOR LATHES.

Application filed July 5, 1924. Serial No. 724,305.

This invention relates to improvements in lathes and particularly to improvements adapted for application to an automatic lathe operating upon work rotatably held between centers.

More particularly, the invention relates to a device for facilitating releasing the work from the tool after operations thereon have been completed.

One feature of importance is that means are provided for quickly moving the tool axially in a direction reverse to its direction of feed as soon as it has finished operation upon the blank so that the point of the cutting tool will be released from the work.

Another object of the invention is to provide a spring pressed plunger adjacent one of the members for actuating the tool so that this member and parts attached thereto will be moved a short distance axially of the blank simultaneously with the completion of operations and simultaneously with the releasing of the driving chuck and the tailstock retaining member.

In automatic lathes in which the work blanks are transferred to operative position, retained between centers in their operative position, automatically rotated on the centers, and cutting means acting thereon are automatically actuated, the work blank is frequently retained in its operative position when the chuck holding the blank releases and the tailstock plunger is withdrawn. This is caused by the point of the cutting tool being embedded in the work blank at the time the chuck and tailstock plunger are disengaged. This interferes with the proper transferring of another blank into operative position so that means are required to assure the work being released so that it may be allowed to fall freely from its operative position. For this purpose, it has been found advantageous to quickly move the tool rearwardly in a direction parallel to the work blank so that the tool is released from the blank and particularly from under the chip in which it may be embedded. Moving the tool in this direction does not interfere with any adjustments of the tool.

In order to give the tool this rearward movement and to permit a simple mechanism to accomplish this retracting movement quickly, I provide a spring pressed plunger so mounted that in any adjustment of the tool or tool carriage for any length of feeding movement or diameter of work it will be properly located to release the tool from the blank as soon as the tool completes its operation and the work is about to be released from operative position.

With the above and other objects in view, my invention consists in the features of construction and operation set forth in the following specification and illustrated in the accompanying drawing.

In the accompanying drawing annexed hereto and forming a part of this specification, I have shown my invention embodied in an automatic lathe of the type disclosed in my Patent No. 1,507,265 granted September 2, 1924, but it will be understood that the invention can be otherwise embodied and that the drawing is not to be construed as defining or limiting the scope of the invention, the claims appended to this specification being relied upon for that purpose.

In the drawing:

Figure 1 shows a front elevation of an automatic lathe having my invention applied thereto;

Fig. 2 is a detail view upon an enlarged scale showing the spring pressed plunger for actuating the tool carriage in its reverse direction to disengage the tool from the work, and Fig. 3 is an end view of the parts shown in Fig. 2.

In the above mentioned drawing, I have shown but one embodiment of the invention which is now deemed preferable, but it is to be understood that changes and modifications may be made within the scope of the appended claims without departing from the spirit of the invention.

My invention is primarily designed for an automatic lathe having the following principal parts: a base 10, a headstock 11 and headstock spindle 12, a tailstock 13 and automatically actuated tailstock plunger 14, work transferring members 15, a chuck 16 for driving the work when it is in its operative position, and tool feeding mechanism. Cam actuated means are provided for automatically actuating these members and means in timed relation to each other so that work W will be transferred to operative position, moved against a headstock center by movement of the tailstock plunger 14, the tailstock plunger 14 retained in operative position, and the work W rotated by the automatic engagement of the driving chuck 16. Adapted to be actuated along the base in a direction parallel to the work is a tool carriage 17, the one shown being similar to that described in my copending application above mentioned. In order to actuate this carriage 17 and its tool, a slide 18 moving along a dove-tail projection 19 is reciprocated by cam strips 20 on a large cam drum 21 mounted on a cam shaft in the base of the machine.

The parts forming the novel elements of the invention are adapted to cooperate with and engage a part moving with the tool and carriage 17. A spring pressed plunger 25 is mounted within a member 26 preferably fastened to the base 10 so that it will engage a collar 27 on the rod 28 by which the tool carriage 17 is reciprocated. Each time the tool carriage 17 is moved toward the left during the feeding operation, the collar 27 on the rod 28 will compress the spring 29 and retract the plunger 25 until the cam strip 20, by means of which slide 18 is reciprocated, passes by the roller 30 on slide 18. The slide 18 will then be forced quickly to the right by the spring 29 carrying with it the tool carriage 17 and tool.

By properly adjusting the position of collar 27 on the actuating rod 18 attached at one end to the tool carriage 17, the tool carriage 17 may be reciprocated by the slide 18. The slide 18 also may be reciprocated through a constant distance for any length of feeding movement. For any adjustment of travel of the tool carriage 17, the collar 27 engaged by the spring pressed plunger 25 will always reciprocate between the same points. Another collar on this rod is so placed that on return movement of the slide, the carriage will be brought back to its original position.

Securely fastened to the front vertical surface of the lathe base 10 is the member 26 having the plunger 25 extending therethrough. This plunger 25 is provided with a head 31 and, between the head 31 and portions of the member 26, the coiled spring 29 is inserted. Nuts 32 on the outer end of the plunger 25 limit the forward movement of the plunger.

The member is so positioned on the base 10 of the lathe that the head 31 on the plunger 25 will be engaged by the adjustable collar 27 on the operating rod 28 just prior to the completion of the cutting operation. Continued feeding movement of the carriage 17 will therefore cause the plunger 25 to be moved to the left as seen in Figs. 1 and 2 until the roller 30 on the feed slide 18 is disengaged from its cam strip 20. At this point, the spring 29 forces the plunger 25 to the right thus also moving the slide 18, the rod 28 and the tool carriage 17 in the same direction. This movement, which may be not more than 1/4 of an inch is sufficient to disengage the point of the tool from the portion of the work W being operated on and away from the chip being formed. It will therefore be seen that as soon as the tailstock spindle 14 is withdrawn and the chuck 16 released, the work W will be free to drop from operative position without interference occasioned by the work being held in position by its engagement with the point of the tool.

By reason of the spring 29 being free to actuate the tool carriage 17 as soon as the cam strip 20 passes by the roller 30, the tool carriage 17 may be moved while the work W is still retained in its operative position by the tailstock spindle 14 and chuck 16. A second collar 33 on rod 28 serves to return the carriage 17 to its initial or starting position.

What I claim is:

1. A lathe comprising in combination, a base, work supporting and rotating means thereon, means to automatically disengage a work blank from said supporting and rotating means, a cutting tool, means to actuate said tool longitudinally of the base during its operation, and means positioned adjacent the end of movement of a member forming part of said means to actuate said tool to force said tool in a direction opposite to that in which it is fed at the end of the feeding movement and when the work is being released from said actuating means and from said supporting and rotating means.

2. A lathe comprising in combination, a base, work supporting and rotating means thereon, means to automatically disengage a work blank from said supporting and rotating means, a cutting tool, means to actuate said tool during its operation, and a resiliently pressed plunger positioned adjacent the end of movement of a member forming part of said means to actuate said tool, said plunger forcing said tool in a direction opposite to that in which it is fed at the end of the feeding movement and when the blank is being released from said actuating means and from said supporting and rotating means.

3. A lathe comprising in combination, a base, work supporting and rotating means thereon, means to automatically feed a tool along the base while in engagement with a work blank, means to automatically disengage a work blank from said supporting and rotating means, means positioned adjacent the end of movement of a member forming part of said means to actuate said tool to resiliently force said tool at the end of its feeding movement in a direction opposite to that in which it is fed, and means to permit such movement of the tool at the completion of its cutting operation and as the work is being released from said actuating means and from said supporting and rotating means.

In testimony whereof, I hereto affix my signature.

JOHN J. THACHER.